Sept. 11, 1923.
W. G. ALLEN
1,467,746
METHOD OR PROCESS FOR PRESERVING FRUIT AND THE LIKE
Filed Nov. 14, 1921
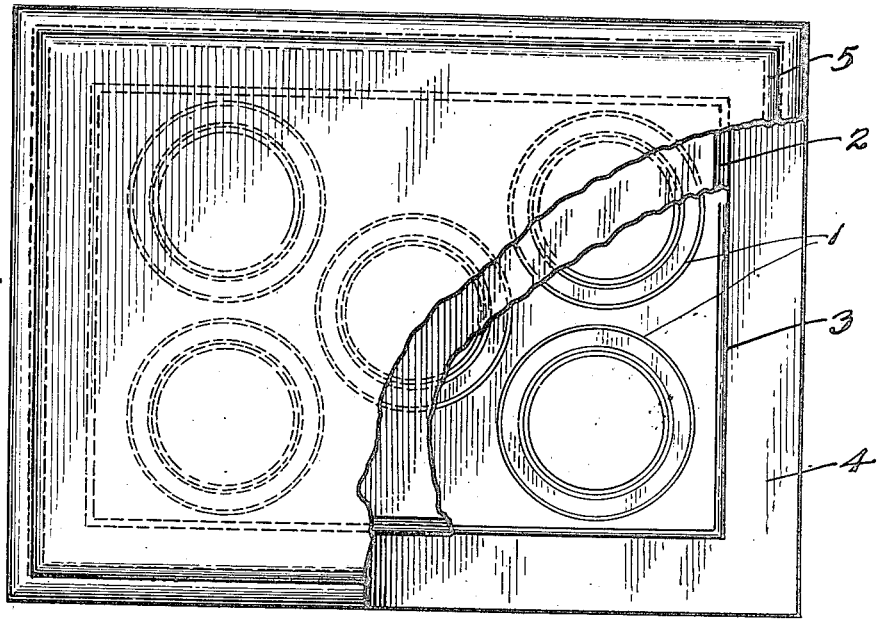
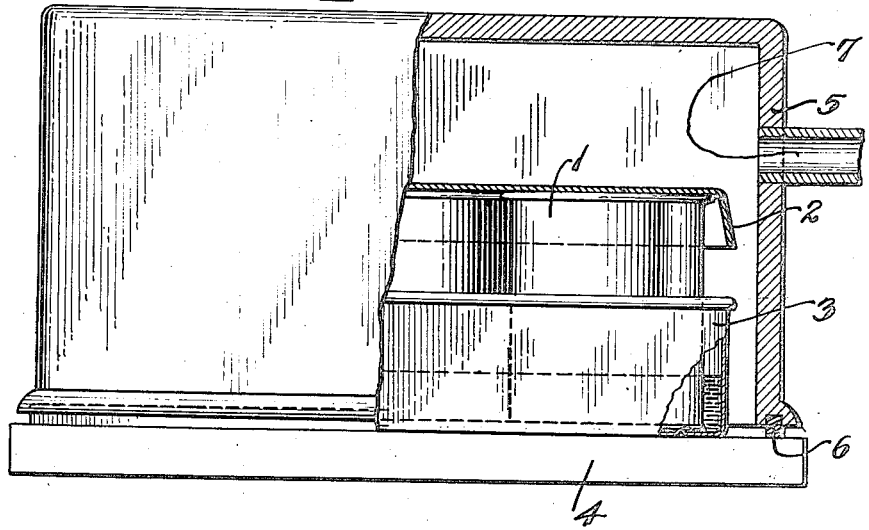
Witness:
E. H. Wagner
Inventor
William G. Allen
By Robb, Robb & Hill
Attorneys Patented Sept. 11, 1923.

1,467,746

UNITED STATES PATENT OFFICE.

WILLIAM G. ALLEN, OF SALEM, OREGON.

METHOD OR PROCESS FOR PRESERVING FRUIT AND THE LIKE.

Application filed November 14, 1921. Serial No. 514,957.

*To all whom it may concern:*

Be it known that I, WILLIAM G. ALLEN, a citizen of the United States, residing at Salem, in the county of Marion and State of Oregon, have invented certain new and useful Improvements in Methods or Processes for Preserving Fruit and the like, of which the following is a specification.

The present invention appertains to the art of preserving and in particular to a novel process or method of preparing fruit and the like for canning.

The primary object of my invention is to provide for a thorough or uniform syruping of the products to be preserved while disposed in their permanent containers, or, stating it from another standpoint, to insure the complete removal of air both from the containers and the cells or pores of the contents and introduce in its place a suitable preserving liquid which by virtue of the method I employ prevents deterioration of said products and facilitates the operation of preparing the fruit for processing in the customary manner.

I am well aware that this has been an objective of a number of methods heretofore proposed, but the attempts to accomplish the desired results have involved either a complication of steps or machinery or both, or have been defective because of the difficulties which are encountered in handling certain types of fruit and which prevent thorough impregnation of the same with the preserving fluid.

My efforts have been, therefore, to overcome these difficulties, some of which will be more specifically referred to hereinafter, and render the preparation of the fruit very simple, economical and effective.

Broadly speaking, my invention contemplates the "vacuumizing" of the fruit preferably in the permanent containers in which it is placed, or the withdrawal of the air both from the container and from the cells of the fruit and allowing the preserving liquid or syrup to be forced thereinto under the influence of the unbalanced pressures exteriorly and interiorly of the containers, so arranging or disposing just the right amount of syrup that, when the vacuous condition which I create within the container is released, this syrup will completely fill the container and the fruit cells throughout the entire contents of said containers, after which the latter are sealed and sterilized in the customary manner.

Figure 1 is a top plan view of an embodiment of the present invention, a portion of the cover for the vacuum chamber being broken away.

Figure 2 is a side elevation of the apparatus, the cover being broken away to show more clearly the interior details.

As illustrative of one method of carrying out this process, which is applicable to the packing of all varieties of fruit and the like, I first fill a suitable number of the permanent containers 1 with the fruit as done in general practice at the present time. The cans are then placed upon trays, each tray 2 having a predetermined capacity for receiving a desired number of the cans according to the size of the latter. Upon the cans of a tray I now place a comparatively shallow pan 3, one having a depth say of approximately four inches, this pan or receptacle being disposed in inverted position so as to close the mouths of the cans. The tray with its cans and the inverted receptacle is now turned upside down, all together, so that the cans rest in inverted position within the shallow receptacle referred to. I now pour into this pan a quantity of preserving syrup or water, the quantity being just sufficient preferably to fill all of the cans contained therein.

As many cans and trays thereof are employed as will fill to capacity a vacuumizing chamber into which the trays of cans are inserted one upon another, the chamber being customarily of sufficient size to hold several hundred cans at least at one time. The chamber comprises the base 4, the cover 5 and sealing gasket 6 to completely enclose the cans and a suitable vacuum pump (not shown) is employed to exhaust the air from both the chamber and the cans therein through the connection 7. It will be understood that the preserving liquid in the shallow pans acts as a liquid seal and the air from the interior of the cans and from the cells of the fruit is withdrawn through this liquid seal. The fruit itself, however, is not disturbed or withdrawn from the cans by this action but is maintained isolated against contact with the air because of the interposition of the liquid seal. There exists naturally a balanced state of pressures exteriorly and interiorly of the fruit containers while this vacuous condition prevails. I now release the vacuum in the vacuum chamber whereupon, owing to the atmospheric pressure upon the surface of the preserving liquid in the shallow receptacles as well as the vacuum condition within the cans, the preserving liquid is forced or drawn into the fruit cans and into the cells of the fruit. Owing to this arrangement the impregnation of the fruit is uniform because sufficient time is allowed for the preserving liquid or syrup to enter the entire contents of the cans, and inasmuch as the liquid is rapidly passed into the interior of the cans, the air does not have an opportunity to come into contact with the contents as just stated. I find it preferable to employ only that amount of liquid which is easily predetermined which will be just sufficient to fill the cans because the trays and the cans are now turned right side up as they are removed from the vacuum chamber. The cans are now closed and the contents cooked in the customary manner.

In order to bring out more clearly the novel characteristics of my process or method, it may be well to here mention by way of distinction a type of process which has heretofore been proposed. Where the method is followed of placing the fruit in the preserving liquid and completely submerging the same with the cans at all times right side up, it is absolutely necessary to weight the fruit to be vacuumized so that at no time it will come in contact with the air. If this is not done the fruit will have a tendency to rise in the liquid and float and that portion on the top of the cans will be exposed to the air which will quickly enter the pores of the fruit before the liquid and thus that portion will show no effect of the vacuumizing process. Therefore, in this method it is not feasible to place the fruit in the permanent containers, as excessive quantities of liquid must be used and the cans may only be partially filled with fruit because an excessive quantity of liquid must be available at all times. That is to say, owing to the absorption by or permeation of a certain amount of the liquid into the fruit cells the liquid level will be lowered from the top of the can, requiring that an additional quantity of the liquid be placed in the receptacle to prevent the fruit from coming in contact with the air until a sufficient time has elapsed for the liquid to entirely permeate the fruit cells.

On the contrary, by my method of inversion as above described, the cans may be completely filled with fruit and practically the exact quantity of the liquid required to fill the cans after they are vacuumized may be supplied. Thus I am able to obtain a uniform result and the fruit is therefore of a superior quality.

I desire it to be understood, however, that it is feasible to accomplish the result aimed at here without resorting to the method of inversion of the cans as a step in the process since numerous ways of providing a liquid seal of the preserving fluid are capable of being devised.

Having thus described my invention, what I claim as new and desire to secure by Letters Patent is:

1. The process of preparing fruit for canning which consists in surrounding with a liquid seal the entrance of a container having unsyruped fruit therein, enclosing the container thus sealed within a chamber, creating a vacuous condition exteriorly and interiorly of the container, and then releasing the vacuous condition to permit the sealing liquid to pass into the container under the influence of the vacuum therein.

2. The process of preparing fruit for canning which consists in introducing a container having unsyruped fruit therein into a preserving liquid, and creating a vacuous condition in the container and the fruit cells to cause the preserving liquid to enter the container and the fruit cells.

3. The process of preparing fruit for canning which consists in introducing a container having unsyruped fruit therein into a preserving liquid of sufficient quantity only to fill the container, and creating a vacuous condition in the container and the fruit cells to cause the preserving liquid to enter the container and the fruit cells.

4. The process of preparing fruit for canning which consists in filling the permanent container with fruit to be preserved, sealing the entrance of said container with a preserving liquid, and creating a vacuous condition in the container and the fruit cells to cause the preserving liquid to enter the container and the fruit cells.

5. The process of preparing fruit for canning which consists in placing a container with fruit therein to be preserved in inverted position within a receptacle containing a liquid to form a liquid seal, creating a vacuous condition within the container and the pores of the fruit while under such seal, and then releasing the vacuum to allow atmospheric pressure to cause the sealing liquid to enter the container and the pores of the fruit.

6. The process of preparing fruit for canning which consists in placing a container with fruit therein to be preserved in inverted position within a chamber containing a quantity of syruping liquid, creating a vacuous condition within the chamber and the container, and then releasing the vacuum to cause the syruping liquid to enter the container and permeate the fruit.

7. The process of preparing fruit for canning which consists in placing a container with unsyruped fruit therein within a chamber containing a predetermined quantity of syruping liquid, creating a vacuous condition within the chamber and the container, and then releasing the vacuum to cause the syruping liquid to enter the container and permeate the fruit.

8. The process of preparing fruit for canning which consists of placing a container with unsyruped fruit within a shallow receptacle, introducing a syruping liquid into said receptacle, enclosing the receptacle and container within a chamber, withdrawing the air from the fruit through the syruping liquid, and then causing the syruping liquid to pass into the container and the fruit under the influence of the unbalanced pressures created.

9. The process of preparing fruit for canning which consists of placing a container with unsyruped fruit within a shallow receptacle, introducing an amount of syruping liquid into the receptacle sufficient only to substantially fill the container and the pores of the fruit, enclosing the receptacle and container within a chamber, withdrawing the air from the fruit through the syruping liquid, and then causing the syruping liquid to pass into the container and the fruit under the influence of the unbalanced pressures created.

10. The process of preparing fruit for canning which consists in placing the container with unsyruped fruit within a shallow receptacle in inverted position, introducing a syruping liquid into said receptacle to form a liquid seal, enclosing the receptacle and container within a chamber, withdrawing the air from the fruit through the syruping liquid, and then causing the syruping liquid to pass into the container and the fruit under the influence of the unbalanced pressures created.

In testimony whereof I affix my signature.
WILLIAM G. ALLEN.